(12) United States Patent
Caley

(10) Patent No.: US 10,184,440 B2
(45) Date of Patent: Jan. 22, 2019

(54) MULTI-FUEL DELIVERY SYSTEM

(75) Inventor: David James Caley, City Beach (AU)

(73) Assignee: ORBITAL AUSTRALIA PTY LTD, Balcatta (AU)

(*) Notice: Subject to any disclaimer, the term of this patent is extended or adjusted under 35 U.S.C. 154(b) by 134 days.

(21) Appl. No.: 14/126,057

(22) PCT Filed: Jun. 29, 2012

(86) PCT No.: PCT/AU2012/000774
§ 371 (c)(1),
(2), (4) Date: Jan. 28, 2014

(87) PCT Pub. No.: WO2013/003889
PCT Pub. Date: Jan. 10, 2013

(65) Prior Publication Data
US 2014/0130776 A1 May 15, 2014

(30) Foreign Application Priority Data
Jul. 4, 2011 (AU) ................................ 2011902650

(51) Int. Cl.
*F02M 69/04* (2006.01)
*F02M 21/02* (2006.01)
(Continued)

(52) U.S. Cl.
CPC ............. *F02M 69/04* (2013.01); *F02B 69/04* (2013.01); *F02D 19/0613* (2013.01);
(Continued)

(58) Field of Classification Search
CPC .... F02M 69/04; F02M 63/0285; F02M 43/04; F02M 67/12; F02M 67/02;
(Continued)

(56) References Cited

U.S. PATENT DOCUMENTS

| 4,606,322 A | 8/1986 | Reid et al. |
| 5,546,908 A | 8/1996 | Stokes |

(Continued)

FOREIGN PATENT DOCUMENTS

| EP | 1174608 A2 | 1/2002 |
| WO | WO 2008/000095 A1 | 1/2008 |

OTHER PUBLICATIONS

International Search Report and Written Opinion for PCT/AU2012/000774, dated Aug. 31, 2012; ISA/AU.

(Continued)

*Primary Examiner* — Grant Moubry
(74) *Attorney, Agent, or Firm* — Harness, Dickey & Pierce, P.L.C.

(57) ABSTRACT

A method for fuelling an internal combustion engine, and a fuel system (10) for delivering a variety of fuel types to the engine, with selected fuel types typically being chosen according to theft availability. The fuel system (10) can be configured to accommodate liquid fuels such as gasoline, ethanol or a blend thereof, and gaseous fuels such as CNG, LNG or LPG. The engine is configured to operate on any of the designated liquid fuels, and can switch between the liquid and gaseous fuels. The fuel system (10) includes a respective common delivery arrangement (11) for selectively delivering fuel into the combustion chamber of each cylinder of the engine. The common delivery arrangement (11) comprises at a fluid delivery device (12) and a liquid metering device (31) configured for operation in concert. The fluid delivery device (12) comprises a fluid delivery injector. Fuel is delivered to each combustion chamber is through the same fluid delivery device; that is, the same fluid delivery device (12) is used, regardless of the fuel type. More particularly, the fluid delivery device (12) can be used for delivery of gaseous fuel only, delivery of liquid fuel only (by way of an air assist delivery process), or delivery of a (Continued)

fuel mixture comprising the gaseous fuel and the liquid fuel according to the fuelling requirements of the engine at any time.

32 Claims, 2 Drawing Sheets

(51) Int. Cl.
*F02B 69/04* (2006.01)
*F02D 19/06* (2006.01)
*F02D 41/00* (2006.01)
*F02M 63/02* (2006.01)
*F02M 43/04* (2006.01)
*F02M 67/02* (2006.01)
*F02M 67/12* (2006.01)
*F02D 41/38* (2006.01)

(52) U.S. Cl.
CPC ..... *F02D 19/0647* (2013.01); *F02D 19/0692* (2013.01); *F02D 19/0694* (2013.01); *F02D 41/0027* (2013.01); *F02M 21/0269* (2013.01); *F02M 43/04* (2013.01); *F02M 63/0285* (2013.01); *F02M 67/02* (2013.01); *F02M 67/12* (2013.01); *F02D 2041/3881* (2013.01); *Y02T 10/32* (2013.01); *Y02T 10/36* (2013.01)

(58) Field of Classification Search
CPC ........... F02M 21/0269; F02M 21/0218; F02M 21/0248; F02M 21/0278; F02M 55/00; F02M 55/008; F02D 19/0613; F02D 19/0694; F02D 19/0647; F02D 19/0692; F02D 19/0639; F02D 19/0642; F02D 19/066; F02D 19/0663; F02D 19/0686; F02D 19/08; F02D 41/0027; F02D 41/0025; F02D 2041/3881

USPC .................................................. 123/525, 445
See application file for complete search history.

(56) References Cited

U.S. PATENT DOCUMENTS

| | | | | |
|---|---|---|---|---|
| 5,890,459 | A * | 4/1999 | Hedrick | F02B 69/02 123/27 GE |
| 6,035,837 | A | 3/2000 | Cohen et al. | |
| 7,011,048 | B2 * | 3/2006 | Gurin | B01F 3/04468 123/1 A |
| 7,418,954 | B2 * | 9/2008 | Iwai | B01F 3/02 123/27 GE |
| 7,614,385 | B2 * | 11/2009 | Bysveen | F02D 19/0647 123/456 |
| 7,765,992 | B2 * | 8/2010 | Iwai | B01F 3/02 123/27 GE |
| 7,789,047 | B2 * | 9/2010 | Kuroki | C01B 3/02 123/1 A |
| 7,950,370 | B2 * | 5/2011 | Lucas | F02D 19/0605 123/435 |
| 8,925,518 | B1 * | 1/2015 | Riley | F02B 19/10 123/261 |
| 2002/0195088 | A1 | 12/2002 | Oprea | |

OTHER PUBLICATIONS

Written Opinion of the International Preliminary Examining Authority, dated Jul. 5, 2013; IPEA/AU.
International Preliminary Report on Patentability, dated Oct. 1, 2013; IPEA/AU.
European Search Report and Written Opinion for EP 12807781, dated Aug. 8, 2016.

* cited by examiner

MULTI-FUEL DELIVERY SYSTEM

CROSS-REFERENCE TO RELATED APPLICATIONS

This application is a 371 U.S. National Stage of International Application No. PCT/AU2012/000774, filed on Jun. 29, 2012, and claims priority to Australian Patent Application No. 2011902650, filed on Jul. 4, 2011, the disclosures of which are herein incorporated by reference in their entirety.

FIELD OF THE INVENTION

This invention relates to operation of an internal combustion engine on a plurality of fuels. In particular, the invention relates to a fuel system for an internal combustion engine having the capacity to use a plurality of fuel types.

This invention also relates to an internal combustion engine capable of operation on a plurality of fuel types.

Further, the invention relates to a fuel system for an internal combustion engine, the fuel system being configured for delivery of a plurality of fuel types to the internal combustion engine.

Still further, the invention relates to a method for delivering fuel to an internal combustion engine, the fuel being one or more fuel types selected from a plurality of fuel types on which the engine is configured to operate.

BACKGROUND ART

The following discussion of the background art is intended to facilitate an understanding of the present invention only. The discussion is not an acknowledgement or admission that any of the material referred to is or was part of the common general knowledge as at the priority date of the application.

With the availability and variety of fuels that exists, both now and into the future, it may be desirable for vehicles to have the capability of operating with more than one fuel type. In particular, it would be advantageous for a vehicle to be able to use of a variety of liquid and/or gaseous fuels, or mixtures of such fuels, depending on what fuel is available. This is particularly important in remote regions where fuel supply may be uncertain. Further, because of slow development of fuel distribution infrastructure in some regions, some vehicles need to use both gaseous and liquid fuels to overcome availability problems. In such circumstances, vehicle engines may need to run on combinations of gaseous and liquid fuels or mixtures of liquid fuels. Additionally, some engines may need to use two separate fuels at the same time.

Accordingly, there exist benefits in providing an engine which is capable of using more than one fuel type. It would also be desirable for any such engine to be configured to run on a combination of a gaseous fuel and a liquid fuel, and optionally also to run on either of the fuels separately.

There have been various proposals for delivery of two different fuels to an engine.

One such proposal is disclosed in US2002/0195088 which is directed to a dual fuel system for feeding a main fuel and a secondary fuel to an internal combustion engine. The dual fuel system utilises a common fuel injector configured for indirect fuel injection for delivery of fuel into an air intake duct of the engine. The common fuel injector is connected to two separate fuel paths, one for the main fuel and the other for the secondary fuel. Each fuel path has a separate fuel rail to which the common fuel injector is connected. The fuel injector has two separate fuel paths isolated from each other and each communicating with a respective fuel rail. As the fuel injector is configured to provide two separate fuel paths, the two fuels can be delivered in a common injection event. However, the two fuels are metered separately and delivered through separate delivery ports, albeit within the common fuel injector. Accordingly, the two fuels are neither delivered through the same delivery port nor brought together until delivery into the engine air intake duct; that is, there is no mixing of the two fuels when the engine is operating in a dual fuel mode until after delivery into the engine air intake duct.

The present invention, in at least one application thereof, seeks to provide the capability for an engine to use more than one fuel type, and to operate on either of the fuel types separately as well as operate on a combination of the two fuel types.

Any such engine would preferably also be configured to run on a combination of a gaseous fuel and a liquid fuel, and optionally also to run on either of the fuels separately.

DISCLOSURE OF THE INVENTION

According to a first aspect of the invention there is provided a method for fuelling an internal combustion engine, the method comprising providing a supply of a first fluid and a supply of a second fluid, at least one of which fluids comprises a fuel for combustion in a combustion chamber, and selectively delivering either the first fluid or the second fluid or a mixture thereof to the engine in an injection event through a delivery port, wherein when operating in a mode for delivery of a mixture of the two fluids the first fluid is delivered into the presence of the second fluid as a metered quantity of the first fluid, and the second fluid is metered during the injection event to provide a metered quantity delivered during the injection event, whereby metered quantities of both the first and second fluids are delivered as the mixture through the delivery port during the injection event.

Preferably, the first fluid comprises a liquid fuel. The liquid fuel may comprise gasoline, an alcohol fuel such as ethanol or methanol, or a blend thereof.

Preferably, the second fluid comprises a gas.

The gas may comprise a gaseous fuel or a gaseous fluid which is not intended as a fuel. The latter may, for example, comprise air or an inert gas.

The term "gaseous fuels" as used herein refers to compressed gas fuels such as compressed natural gas (CNG) and hydrogen ($H_2$), and liquefied gaseous fuels such as liquefied petroleum gas (LPG) and liquefied natural gas (LNG).

The method may further comprise providing a supply of a third fluid and selectively delivering the third fluid to the combustion chamber.

The method may comprise selectively switching between the second and third fluids.

The method may also comprise selectively delivering a mixture of the second and third fluids.

Preferably, the first fluid or the second fluid or a mixture thereof is delivered through a common delivery arrangement defining the delivery port. Typically, the common delivery arrangement comprises a single delivery port, wherein delivery of fluid during an injection event is entirely through the single delivery port. In certain cases, however, the common delivery arrangement may comprise several delivery ports, wherein delivery of fluid comprising the first fluid or the second fluid or a mixture thereof is performed during an injection event via the several delivery ports. In such cases, the fluid delivered would be distributed between the delivery ports concerned. Accordingly, if for example the fluid delivered comprises a mixture of fluids, a proportion of the fluid mixture would be delivered through each delivery port. The different fluids comprising the fluid mixture would not be delivered separately of each other through different delivery ports but rather the fluid mixture would be split between the delivery ports concerned. An example of such a situation might be where the fluid mixture is required to be delivered into a combustion chamber in a distributed fashion, with a portion of the fluid mixture being directed in one direction within the combustion chamber and a further portion of the fluid being directed in another direction within the combustion chamber. The same situation would apply if the delivered fluid comprises only the first fluid or the second fluid, with the fluid concerned being distributed between the delivery ports.

The common delivery arrangement may be configured to perform functions of both fluid metering and fluid delivery. In a fuelling requirement involving gaseous fuel only, the common delivery arrangement operates to perform the function of fluid delivery but not the function of fluid metering as no liquid metering is required.

Preferably, the common delivery arrangement has a fluid metering portion and a fluid delivery portion.

Where the first fluid comprises liquid and the second fluid comprises gas, preferably, the liquid is delivered by the fluid metering portion into the fluid delivery portion in the presence of the gas as a metered quantity of liquid, and the gas is delivered as a metered quantity during the injection event. With this arrangement, metered quantities for both the liquid and gas are delivered.

The injection event may involve delivering the liquid and the gas, with the quantity of the gas delivered being adjusted to allow for the quantity of liquid delivered with the gas.

Preferably, the liquid is delivered by the fluid metering portion into the fluid delivery portion in the presence of the gas as a metered quantity of liquid, and the gas is delivered as a metered quantity during the injection event, with the metered quantity of gas being adjusted to allow for the quantity of liquid delivered with the gas.

Adjustment of the injection event to compensate for the quantity of liquid to be delivered during injection may take any appropriate form, including for example adjustment of the duration of the injection event, adjustment of the pressure of the gas during the injection event, adjustment of the quantity of fluid injected, or any combination thereof.

More particularly, in one arrangement, the duration of the injection event is adjusted to compensate for the effect of injected liquid on the flow rate during injection. In another arrangement, the pressure of gas during the injection event is adjusted to compensate for the effect of injected liquid on the flow rate during injection. In yet another arrangement, the quantity of injected liquid is adjusted to compensate for the effect of injected liquid on the flow rate during injection.

Preferably, the quantity of gas injected is controlled by the duration of the injection event.

Preferably, the common delivery arrangement comprises a fluid delivery device and a fluid metering device configured to operate in concert, with the first fluid being metered by the fluid metering device and delivered to the fluid delivery device and the second fluid being metered by the fluid delivery device during the injection event. In this way the fluid metering device and the fluid delivery device cooperate to provide a common delivery assembly. With such an arrangement, the fluid delivery device provides the fluid delivery portion and the fluid metering device provides the fluid metering portion. It should, however, be understood that the common delivery arrangement may comprise a single device configured to perform the functions of both fluid metering and fluid delivery.

Typically, the fluid metering device comprises a liquid metering device.

The fluid delivery portion may be configured for either direct injection, or indirect injection such as port fuel injection or multipoint fuel injection.

Preferably, the fluid delivery portion is configured to have a delivery port for fluid delivery, with the fluid delivery comprising either a single fluid or a mixture of fluids.

The term delivery port as used herein is taken to include a path which is opened and closed for controlling fluid delivery.

Preferably, the delivery port comprises the sole delivery port within the fluid delivery device. However, in certain cases, the fluid delivery device may comprise several delivery ports, wherein delivery of fluid comprising the first fluid or the second fluid or a mixture thereof is performed in a delivery event via the several delivery ports.

Preferably, the fluid delivery portion is configured for direct injection of the delivered fluid into the combustion chamber of the engine.

Where the common delivery arrangement comprises a fluid delivery device and a fluid metering device configured to operate in concert, interaction between the fluid delivery device and the fluid metering device is designed to achieve consistent transportation of the fluid through the delivery arrangement.

The metering of the first and second fluids may be distinctly sequential such that metering of the first fluid is completed prior to an injection event or there may be some overlap such that metering of the first fluid occurs during at least part of an injection event.

In other words, in one arrangement, the first fluid is metered prior to an injection event and the second fluid is metered during the injection event. In another arrangement, the metering of the first fluid overlaps for some portion with delivery of the mixture of the first and second fluids to the combustion chamber; that is, the metering of the first fluid overlaps for some portion of delivery of the mixture from the delivery arrangement to the combustion chamber.

Where the first fluid comprises liquid and the second fluid comprises gas, preferably the quantity of liquid to be delivered is determined and the corresponding quantity of gas to be delivered with the liquid is determined based on the quantity of liquid to be delivered.

The determination of the quantity of the liquid to be delivered during the injection event may be made in any appropriate way. Typically the determination is made in accordance with the operating parameters of the engine and load demand (which in the case of a motor vehicle comprise driver demand).

Preferably, the determination of the quantity of the liquid to be delivered during the injection event is made by a control system such as an engine control unit (ECU) adapted to control operation of a fuel system performing the method according to the invention.

In one arrangement, the method further comprises reference to a "look-up" map or table to determine the characteristic effect of a selected quantity of fluid on the gas flow of the fluid delivery device.

In another arrangement, a mathematical equation may be used to represent the characteristic effect of a selected quantity of fluid on the gas flow of the fluid delivery device.

Preferably, the determination of the corresponding quantity of gaseous fuel to be delivered with the liquid fuel is made by prediction based on the quantity of liquid to be delivered. The prediction may be made by reference to a "look-up" map or table.

Typically, the ECU would refer to the "look-up" map or table to determine the required quantity of gaseous fuel based on the quantity of liquid fuel.

The liquid may comprise a single liquid or a mixture of a plurality of liquids. The mixture may be blended according to the operational or performance requirements of the liquid.

The gas may comprise a single fluid or a mixture of a plurality of fluids.

The liquid may comprise a liquid fuel.

In one form the gas may comprise a gaseous fuel. The term "gaseous fuels" as used herein refers to compressed gas fuels such as compressed natural gas (CNG) and hydrogen ($H_2$), and liquefied gaseous fuels such as liquefied petroleum gas (LPG) and liquefied natural gas (LNG).

Typically, the liquid and gaseous fuels comprise hydrocarbon fuels. The hydrocarbon fuels may comprise CNG, LNG, LPG, hydrogen, gasoline, diesel, ethanol and mixtures of any one or more thereof.

In another form, the gas may comprise a gaseous fluid that is not a fuel. The gaseous fluid may comprise an inactive fluid which merely contributes to the volume of dual fluid delivered (being the mixture of the liquid and the gaseous fluid). The gaseous fluid may, for example, comprise a portion of the exhaust gas from the engine available through an exhaust gas recirculation process (EGR), carbon dioxide or an inert gas. Alternatively, the gaseous fluid may comprise an active fluid within the delivered fluid mixture. The gaseous fluid may, for example, comprise an oxidant such as air.

The method may be performed in an air-assist fuel delivery system in which the quantity of air delivered (as the gaseous fluid) is metered.

The fluid delivery arrangement may be used once or multiple times per engine cycle.

The pressure of the gas supply to the common delivery arrangement may be varied according to the fuelling requirements of the engine. A higher gas pressure may be used to achieve the required flow rate of gaseous fuel. A lower gas pressure may be used when gas is used for delivery of a liquid fuel. This may assist in reducing the working pressure of an air compressor used to supply compressed air as the gas for an air-assist liquid fuel delivery process. Further, a lower pressure may be used when a lower flow rate of gaseous fuel is required.

Preferably, the injection event comprises direct injection whereby the metered quantities of both the first and second fluids are delivered as the mixture through the delivery port directly into a combustion chamber of the internal combustion engine.

According to a second aspect of the invention there is provided a method for fuelling an internal combustion engine, the method comprising providing a supply of a first fluid and a supply of a second fluid, at least one of which fluids comprises a fuel for combustion in a combustion chamber, and selectively delivering either the first fluid or the second fluid or a mixture thereof to the engine in an injection event through a common delivery arrangement having a fluid metering portion, a fluid delivery portion and a delivery port, wherein when operating in a mode for delivery of a mixture of the first and second fluids the first fluid is delivered by the fluid metering portion into the fluid delivery portion in the presence of the second fluid as a metered quantity of the first fluid, and the second fluid is metered during the injection event to provide a metered quantity delivered during the injection event, whereby metered quantities of both the first and second fluids are delivered as the mixture through the delivery port during the injection event.

According to a third aspect of the invention there is provided a method for fuelling an internal combustion engine, the method comprising providing a supply of a liquid and a supply of a gas, at least one of which fluids comprises a fuel for combustion in a combustion chamber, and selectively delivering either the liquid or the gas or a mixture thereof to the engine in an injection event through a common delivery arrangement having a liquid metering portion, a fluid delivery portion and a delivery port, wherein when operating in a mode for delivery of a mixture of the liquid and the gas, the liquid is delivered by the liquid metering portion into the fluid delivery portion in the presence of the gas as a metered quantity of the liquid, and the gas is metered during the injection event to provide a metered quantity delivered during the injection event, whereby metered quantities of both the liquid and the gas are delivered as the mixture through the delivery port during the injection event.

Preferably, the injection event comprises direct injection whereby the metered quantities of both the liquid and the gas are delivered as the mixture through the delivery port directly into a combustion chamber of the internal combustion engine.

According to a fourth aspect of the invention there is provided a method for fuelling an internal combustion engine, the method comprising providing a supply of a liquid fuel and a supply of a gaseous fuel for combustion in a combustion chamber, and selectively delivering either the liquid fuel or the gaseous fuel or a mixture thereof to the engine in an injection event through a common delivery arrangement having a liquid metering portion, a fluid delivery portion and a delivery port, wherein when operating in a mode for delivery of a mixture of the liquid fuel and the gaseous fuel, the liquid fuel is delivered by the liquid metering portion into the fluid delivery portion in the presence of the gaseous fuel as a metered quantity of the liquid fuel, and the gaseous fuel is metered during the injection event to provide a metered quantity delivered during the injection event, whereby metered quantities of both the liquid fuel and the gaseous fuel are delivered as a mixture through the delivery port during the injection event. The method according to the fourth aspect of the invention may further comprise providing a supply of a gas and selectively delivering the gas to the combustion chamber, wherein the gas is not a fuel. In this arrangement, the gas is a fluid separate of the gaseous fuel. The gas may, for example, comprise air or an inert fluid.

The gas may be selectively delivered to the combustion chamber as a mixture with the liquid fuel.

The gas may be selectively delivered to the combustion chamber as a mixture with the gaseous fuel.

The method may comprise selectively switching between the gaseous fuel and the gas.

Preferably, the injection event comprises direct injection whereby the metered quantities of both the liquid fuel and the gaseous fuel are delivered as the mixture through the delivery port directly into a combustion chamber of the internal combustion engine.

According to a fifth aspect of the invention there is provided a fuel system for an engine, the fuel system delivering fuel to the engine in accordance with the method according to the first, second, third or fourth aspect of the invention.

According to a sixth aspect of the invention there is provided a fuel system for an engine, the fuel system comprising a first fluid path for a first fluid and a second fluid path for a second fluid, the first and second fluid paths communicating with a common delivery arrangement for delivering fuel to the engine, wherein the fuel delivered comprises either the first fluid or the second fluid or a mixture thereof delivered through the common delivery arrangement, and wherein the common delivery arrangement comprises a fluid metering portion, a fluid delivery portion and a delivery port, the common delivery arrangement being selectively operable for delivery of the mixture of the first and second fluids with the first fluid being delivered by the fluid metering portion into the fluid delivery portion in the presence of the second fluid as a metered quantity of the first fluid and the second fluid being metered during the injection event to provide a metered quantity delivered during the injection event, whereby metered quantities of both the first and second fluids are delivered as the mixture through the delivery port during the injection event.

Preferably, the first fluid path is configured for delivery of a liquid fuel.

Preferably, the second fluid path is configured for delivery of a gaseous fuel.

Preferably, the fuel system comprises a third fluid path configured for delivery of compressed air to the common delivery arrangement.

Preferably, the second fluid fuel path and the third fluid path selectively communicate with the common delivery arrangement along a common path, whereby delivery to the common delivery arrangement can be selectively switched between the second fluid fuel path and the third fluid path.

Preferably, the fuel system further comprises a control means adapted to control operation of the fluid delivery portion and the fluid metering portion.

Preferably, the control means comprises as an electronic control unit (ECU).

The fluid delivery portion may be configured for either direct injection, or indirect injection such as port fuel injection or multipoint fuel injection.

According to a seventh aspect of the invention there is provided an internal combustion engine adapted to be fuelled in accordance with a method according to the invention as defined hereinbefore.

According to an eighth aspect of the invention there is provided an internal combustion engine having a fuel system according to the invention as defined hereinbefore.

BRIEF DESCRIPTION OF THE DRAWINGS

The invention will be better understood by reference to the following description of one specific embodiment thereof as shown in the accompanying drawings in which.

BEST MODE(S) FOR CARRYING OUT THE INVENTION

Figure 1:
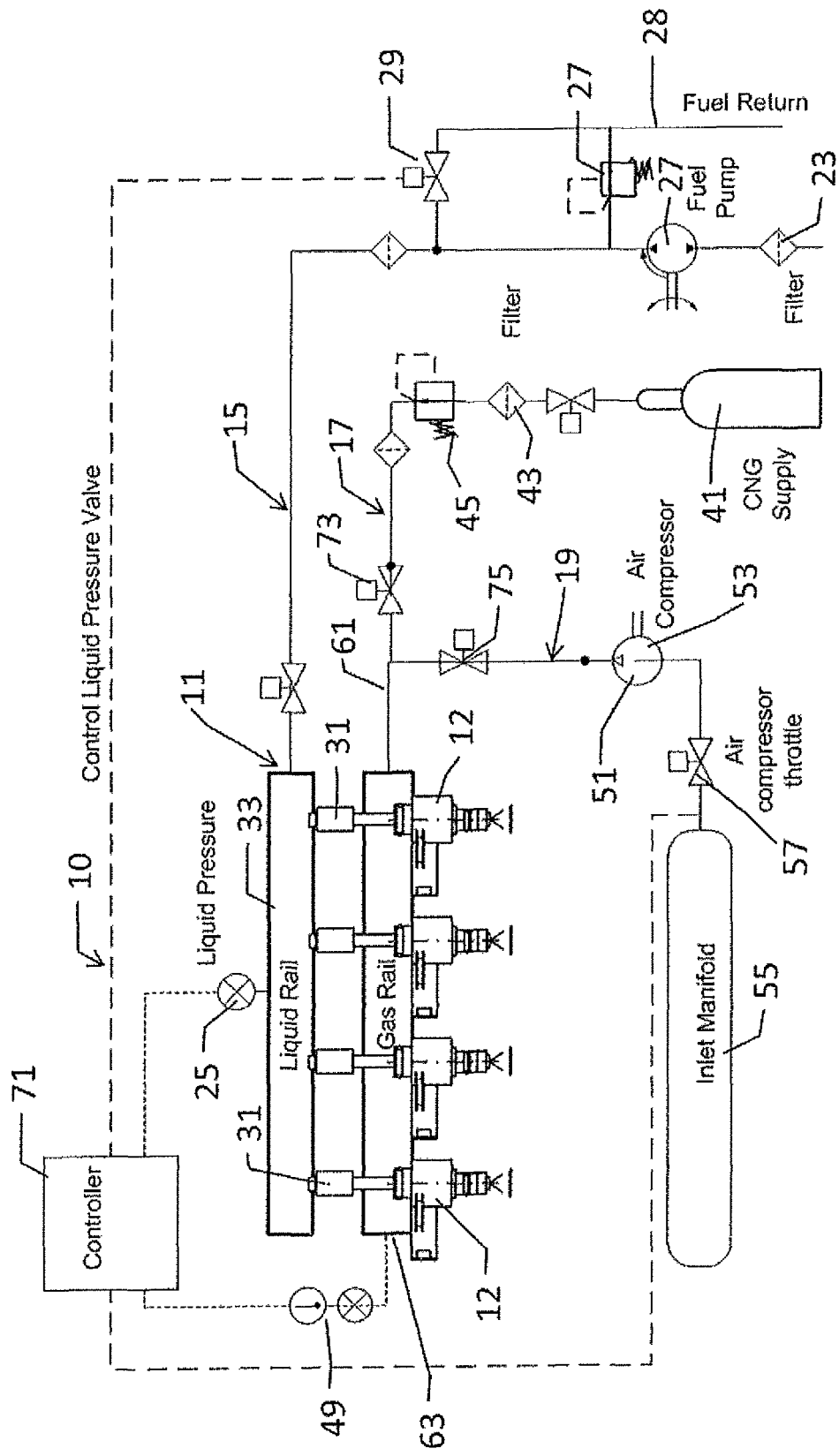
FIG. 1 is a schematic view of a fuel system according to the embodiment.

The embodiment is directed to a fuel system 10 for delivering a variety of fuel types to an engine, with the selected fuel types typically being chosen according to theft availability. The fuel system 10 can be configured to accommodate liquid fuels such as gasoline, ethanol or a blend thereof, and gaseous fuels such as CNG, LNG or LPG. The engine is configured to operate on any of the designated liquid fuels, and can switch between the liquid and gaseous fuels.

The fuel system 10 can be operated selectively to deliver gaseous fuel only, liquid fuel only (by way of an air assist delivery process), or a fuel mixture comprising the gaseous fuel and the liquid fuel.

When the fuel delivered into the combustion chamber comprises a mixture of the gaseous fuel and the liquid fuel, the quantity of liquid fuel comprises a metered quantity, and the quantity of gaseous fuel comprises a controlled quantity dependent upon the metered quantity of liquid fuel delivered. More particularly, the quantity of gaseous fuel is regulated by prediction.

In the embodiment, the fuel system 10 is configured for a direct-injection spark-ignition engine, although the invention may be applied to a compression ignition engine. The invention may also be applied to indirect injection such as port fuel injection or multipoint fuel injection.

In the arrangement shown, the engine comprises a multi-cylinder engine and the fuel system 10 includes a respective common delivery arrangement 11 for selectively delivering fluid into the combustion chamber of each engine cylinder. The invention could, of course, also be applied to a single cylinder engine.

In the arrangement illustrated, each common delivery arrangement 11 comprises at least one fluid delivery device 12 and at least one liquid metering device 31 configured for operation in concert, as will be explained later. The fluid delivery device 12 comprises a fluid delivery injector. With this arrangement, the common delivery arrangement 11 comprises a common delivery assembly comprising the fluid delivery device 12 and the liquid metering device 31.

It is a feature of the embodiment that the fuel delivery into each combustion chamber is through the same fluid delivery device. In other words, the same fluid delivery device 12 is used, regardless of the fuel type. More particularly, the fluid delivery device 12 is used for delivery of gaseous fuel only, delivery of liquid fuel only (by way of an air assist delivery process), or delivery of a fuel mixture comprising the gaseous fuel and the liquid fuel according to the fuelling requirements of the engine at any time.

The fuel system 10 comprises a liquid fuel path 15, a gaseous fuel path 17, and a compressed air path 19, all communicating with each fluid delivery device 12. The three paths share some common componentry, as will become apparent later. In this embodiment, the gaseous fuel path 17, and the compressed air path 19 are configured to operate on a mutually exclusive basis; that is, at any point in time only either the gaseous fuel path 17 or the compressed air path 19 can operate, as will become apparent later. In other embodiments, the fuel system may be configured to deliver both gaseous fuel and air in the same injection event; that is, the gaseous fuel path 17, and the compressed air path 19 may operate independently of each other for delivery of the respective gas (gaseous fuel or air) to the common fluid delivery device 12.

The common delivery arrangement 11 can use gaseous fuel from the gaseous fuel path 17 or air under pressure from the compressed air path 19 as a propellant for delivering a metered quantity of liquid from the liquid fuel path 15 to a respective combustion chamber of the engine.

The fluid delivery device 12 is configured to accommodate the required delivery flow rate of the selected gaseous fuel. This may be achieved by a combination of physical characteristics and supply pressure of the gaseous fuel. Control of the injected quantity of gaseous fuel is then provided by controlling the duration of the injection event or events.

Figure 2:
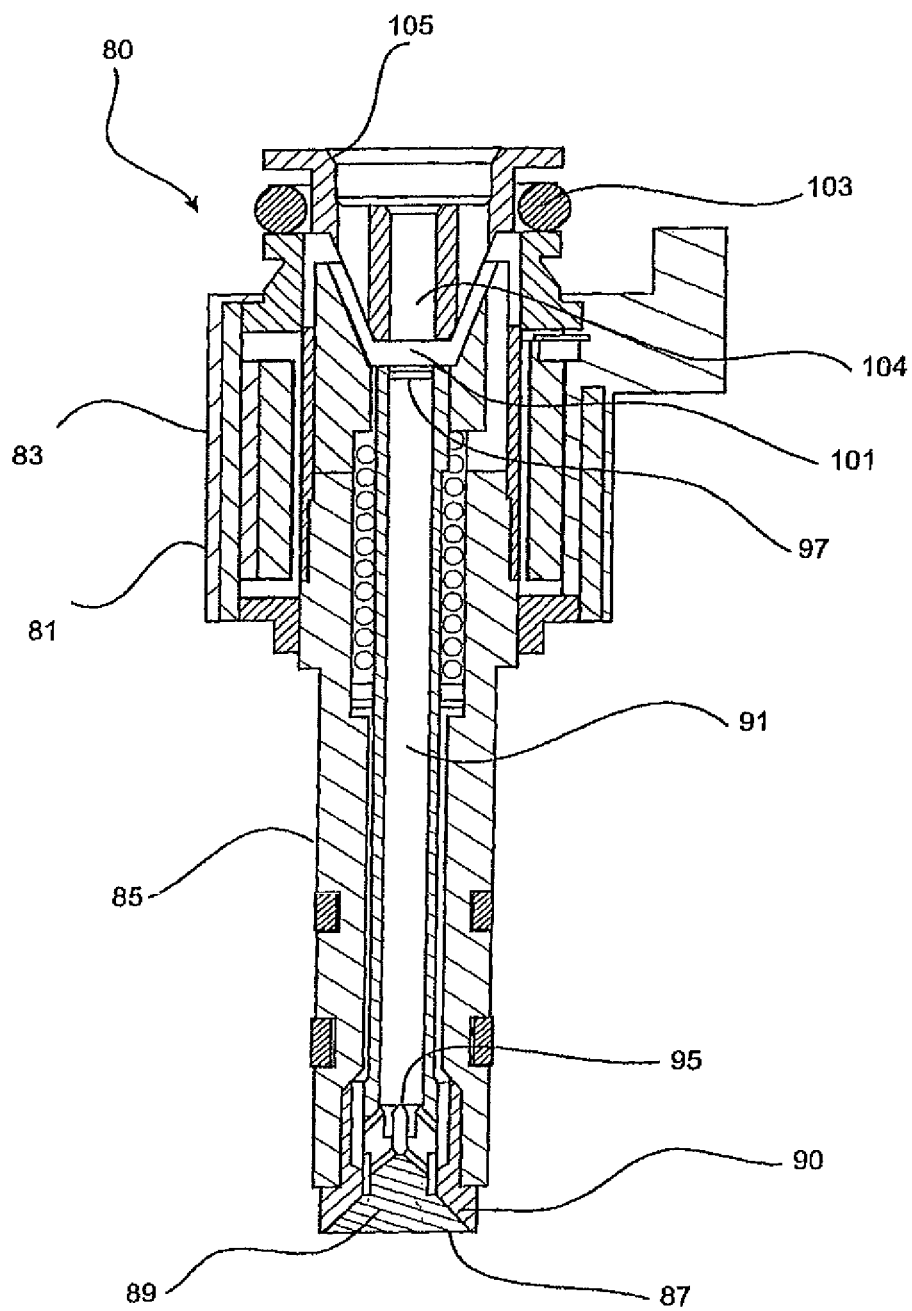
FIG. 2 is a sectional view of a fluid injector used in the injection system according to the first embodiment.

A suitable fluid delivery injector suitable for use as the fluid delivery device 12 is shown in FIG. 2 and will be described later.

The liquid fuel path 15 comprises a liquid fuel supply (not shown) comprising a fuel tank, a liquid fuel pump 21, a fuel filter 23, a pressure transducer 25, a differential pressure regulator 27, a fuel return path 28 and a liquid pressure valve 29.

The liquid fuel path 15 also comprises a liquid metering device 31 for delivering a metered quantity of the liquid fuel to each fluid delivery device 12. More particularly, each liquid metering device 31 is arranged to deliver a metered quantity of the liquid fuel to a respective fluid delivery device 12. The liquid metering devices 31 are mounted in a liquid fuel rail 33 incorporated in the liquid path 15 to receive liquid fuel and transport it to the liquid metering devices 31.

The gaseous fuel path 17 comprises a gaseous fuel supply comprising a fuel tank 41, a filter 43, a pressure regulator 45 to regulate the supply pressure of the gaseous fuel, and a pressure and temperature transducer 49.

The compressed air path 19 comprises a supply 51 of air under pressure. In the arrangement shown the air supply 51 comprises an air compressor 53 communicating with an inlet manifold 55 of the engine through an air compressor throttle 57.

The gaseous fuel path 17 and the compressed air path 19 selectively communicate with the fluid delivery devices 12 along a common path 61 which incorporates a gas rail 63 in which the fluid delivery devices 12 are incorporated.

The fuel system 10 further comprises a control means 71 such as an electronic control unit (ECU) for controlling operation of the fuel system. In particular, the ECU 71 controls operation of the fluid delivery devices 12 and the liquid metering devices 31. Further, the ECU 71 controls valve 73 through which the gaseous fuel path 17 can selectively communicate with the common path 61 and valve 75 through which the compressed air can selectively communicate with the common path 61. In this embodiment, the control arrangement is that only the gaseous fuel path 17 or the compressed air path 19 can communicate with the fluid delivery devices 12 at any one time during engine operation.

The ECU 71 receives input signals from various sensors providing information relating to the operating conditions of the engine and driver demands. The ECU outputs various control signals, including in particular control signals relating to operation of the fluid delivery device 12 and the liquid metering device 31.

The ECU 71 is able to vary the operating parameters of the liquid metering devices 31 in order to meter the required quantity of liquid fuel into the fluid delivery devices 12.

The ECU 71 is also able to vary the operating parameters of the fluid delivery devices 12 in order to meter the required quantity of injected gaseous fuel from gaseous fuel path 17 or air from compressed air path 19 (as the case may be according to the fuelling requirement of the engine).

The ECU 71 determines the fuelling requirements for the engine based upon the input signals from the various sensors providing information relating to the operating conditions of the engine and driver demands. Specifically, the ECU 71 determines the fuel type which is to be delivered to the engine, having regard to the fuel types available, as well as the operating parameters of the engine and load demand.

In this embodiment, the fuelling could be any one of the following: (a) gaseous fuel only; (b) liquid fuel only (by way of an air assist delivery process); or (c) a fuel mixture comprising the gaseous fuel and the liquid fuel. Importantly, fuelling by whichever means results in fuel being delivered to the engine through the same fluid delivery injectors 12 (and through the same delivery port thereof) which are able to handle the injection of each different fuel to the engine.

If the fuelling requirement is gaseous fuel only, the liquid path 15 and the compressed air path 19 are both inactive, and only gaseous fuel is supplied to the fluid delivery injectors 12.

If the fuelling requirement is liquid fuel only, the gaseous fuel path 17 is inactive, and the liquid path 15 and the compressed air path 19 operate in concert. The liquid path 15 supplies metered quantities of liquid fuel through the liquid metering devices 31 to the fluid delivery devices 12, and the compressed air path 19 supplies air under pressure to the fluid delivery devices 12, with the air being used to transport the metered liquid fuel into the combustion chambers during an injection event. In this way, the liquid fuel is delivered by way of an air assist process.

If the fuelling requirement is a fuel mixture comprising the gaseous fuel and the liquid fuel, the compressed air path 19 is inactive, and the liquid fuel path 15 and the gaseous fuel path 17 operate in concert. The liquid path 15 supplies metered quantities of liquid fuel through the liquid metering devices 31 to the fluid delivery injectors 15, and the gaseous fuel path 17 supplies gaseous fuel under pressure to the fluid delivery injectors 15, with the gaseous fuel being used to transport the metered liquid fuel into the combustion chambers during an injection event. With this arrangement, metering of the liquid fuel and metering of the gaseous fluid are performed separately. Specifically, the liquid fuel is metered by the liquid metering devices 31 and the gaseous fluid is metered through operation of the fluid delivery devices 12, with the metering function being controlled by the opening regime of the fluid delivery devices 12 (including in particular the timing of opening). Furthermore, the amount of fluid delivered through the common delivery arrangement 11 may be a function of differential pressure within the system and the characteristics of the mass flow rate of the fluid.

The ECU 71 operates the liquid metering devices 31 to deliver the required quantity of liquid fuel into the fluid delivery devices 12. The ECU 71 also predicts the gaseous fuel flow required to deliver the necessary proportion of gaseous fuel and operates the fluid delivery devices 12 accordingly.

In particular, the ECU refers to a "look-up" map or table to determine the operating parameters of the fluid delivery devices 12 to deliver the necessary quantity of gaseous fuel. Specifically, the ECU operates the fluid delivery devices 12 for the duration necessary to deliver the predicted gaseous fuel flow.

The inputs to the "look-up" map or table may comprise factors such as liquid fuel flow, engine speed, and gaseous fuel pressure and temperature as determined by pressure and temperature transducer 49. The "look-up" map or table is developed having regard to the characteristics of the fluid delivery devices 12.

There may also be provision for mapping with a closed loop system, with feedback being provide from one or more sensors, such as for example an oxygen sensor.

Further a differential pressure is maintained and controlled between the liquid supply and the gas supply so that a controllable flow rate can be achieved through the liquid metering device 31. In this regard, the differential pressure regulator 27 in the liquid fuel path 15 regulate the pressure of the compressed air and liquid fuel supplied such that the pressure of the liquid fuel is at a predetermined level above the pressure of the compressed air so that the liquid fuel can be metered against the pressure of the compressed air.

Referring now to FIG. 2, there is shown a fuel injector assembly 80 suitable for use as the fluid delivery device 12.

The fluid delivery assembly 80 comprises a body 81 having a body portion 83 and a tip portion 85 terminating at an end 87 incorporating a valve 89 operable to deliver a metered quantity of fluid through a delivery port 90 corresponding with the valve. The body 81 incorporates a central passage 91 for conveying the fluid to the end 87. The central passage 91 has a distal end 95 communicating with the valve 89 and a proximal end 97 for receiving a metered quantity of liquid fuel and an unmetered flow of gas (being either gaseous fluid from the gaseous fluid path 17 or air from the compressed air path 19, as the case may be according to the fuelling requirement).

The proximal end 97 of passage 91 communicates with a space 101 within the body portion 83.

The passage 91, space 101 and a volume 103 together act as a holding chamber 104 for the delivery arrangement 11 into which a metered quantity of the liquid fuel can be delivered. The body portion 83 also incorporates a head portion 105 configured to receive the respective liquid metering device 31 (not shown in FIG. 2) which is operable to selectively deliver liquid fuel in metered quantities into the holding chamber 104.

The body 81 is also configured to receive the gas under pressure (being either gaseous fluid from the gaseous fluid path 17 or air from the compressed air path 19, as the case may be according to the fuelling requirement). The gas is delivered into the delivery device 12 via the volume 103 in an unmetered condition.

The gaseous fluid, when flowing through the delivery device 12 and the holding chamber 104 thereof conveys the resultant fluid mixture for injection through the end 87 of the tip portion 85, with the valve 89 metering the quantity of fluid mixture injected through the corresponding delivery port 90. As the fluid mixture flows through the delivery port 90 the liquid in the mixture is atomised.

Preferably, the interface between the fluid delivery device 12 and the liquid metering device 31 is designed to achieve consistent transportation of the liquid through the common delivery arrangement 11.

There may be some residual liquid fuel remaining in the common delivery arrangement 11 after an injection event. It is desirable to configure the common delivery arrangement 11 to achieve consistent transportation of the liquid therethrough, and the common delivery arrangement is preferably designed to achieve this objective.

For the purpose of achieving consistent transportation of the liquid through the common delivery arrangement 11, the residual fuel at the end of an injection event may typically be less about 60% of the maximum delivered fuel.

The interface between the fluid delivery device 12 and the liquid metering device 31 may be designed with regard to constructional features such as the gap between the point at which liquid is delivered into the holding chamber 104 and proximal end 97 of passage 91 communicating with a space 101, and/or the distance between the between the point at which liquid is delivered into the holding chamber 104 and the valve 89. The gap between the point at which liquid is delivered into the holding chamber 104 and proximal end 97 of passage 91 can vary but may possibly be about 10 mm or less. In the arrangement shown, the gap is about 1.5 mm to 2 mm, although this of course may vary. The distance between the between the point at which liquid is delivered into the holding chamber 104 and the valve 89 can also vary but may possibly be about 60 mm or less.

Typically, the valve 89 includes a hollow passage to transport the liquid fuel close to the injector outlet port created upon opening of the valve 89.

Importantly, the fluid delivery device 12 needs to be selected and configured to enable the satisfactory metering and delivery of a gaseous fluid. In practice, a standard direct injection liquid fuel injector would not be appropriate as the delivery device 12 for the common delivery arrangement 11 discussed above. Furthermore, it is worth highlighting again that, in different circumstances, the delivery device 12 needs to be able to both meter and/or deliver fluids to the combustion chamber of the engine, its function being contingent on the specific type of fuel(s) on which the engine is running. As mentioned earlier, metering of the liquid fuel and metering of the gas are performed separately. In the arrangement illustrated, the liquid fuel is metered by the liquid metering device 31 which is positioned on the head portion 105 and which is operable to deliver liquid fuel in metered quantities into the holding chamber 104 of the delivery device 12. Further, the gas is metered through operation of the valve 89, with the metering function being controlled by the opening regime of the valve (including in particular the timing of opening).

As mentioned previously, the gas may comprise gaseous fuel or air, depending upon the fuelling requirement of the engine. In a fuelling requirement involving liquid fuel only, the gas would comprise air in order to provide an air assist delivery process. In a fuelling requirement for a compression ignition engine configured for dual fuel operation with a gaseous fuel and a liquid fuel as a pilot fuel for compression ignition, the gas would comprise the gaseous fuel whilst the liquid fuel may be diesel. With such an arrangement, the gaseous fuel would also serve to transport the liquid fuel from the holding chamber 104 of the delivery device 12 for injection through the end 87 of the tip portion 85 (in a similar manner to air in an air assist delivery process).

Fuelling by way of a fuel mixture can provide advantages in certain applications, including better ignitability and better combustion.

A particularly useful fuel mixture may comprise diesel and CNG, with the diesel component delivering compression ignition. It is believed that a fuel mixture of up to about 95% CNG and 5% diesel would still achieve compression ignition (depending on engine load).

The fuel system 10 may be operated to switch from delivery of one fuel type to another.

The fuel system according to the embodiment can be used with engines operating under two-stroke and four-stroke cycles. Additionally, they can be used with spark-ignition and compression-ignition engines.

In other embodiments, the liquid fuel path 15 may be configured to deliver a liquid other than a fuel. The liquid may, for example, comprise water. Water may be delivered into the combustion chamber for various reasons, including for knock suppression, control of cylinder pressure and combustion control.

In still other embodiments, gases other than gaseous fuels may be delivered into the combustion chamber. The gases may comprise an inactive fluid which merely contributes to the volume of dual fluid delivered (being the mixture of the liquid and the gaseous fluid). The gas may, for example, comprise a portion of the exhaust gas from the engine available through an exhaust gas recirculation process (EGR), carbon dioxide or an inert gas. Alternatively, the gas may comprise an active fluid within the delivered fluid mixture. The gas may, for example, comprise an oxidant such as air.

From the foregoing it is evident that the present embodiment provides an effective way of providing capability for an engine to operate on a variety of fuel types, with the selected fuel types typically being chosen according to theft availability. The engine is configured to operate on any of the designated fuel types and can switch between the liquid and gaseous fuels. Such an arrangement is likely to be particularly advantageous in situations where fuel availability varies. By way of example, there may be a scenario in which the engine is operating on one fuel type. As that fuel depletes and the need to re-fuel arises, it may be that the same type of fuel is unavailable at the location concerned. In such circumstances, a change can be made to the fuelling mode of the engine such that it can operate on another designated fuel type available at that location. Accordingly, the engine can continue to operate even though fuel availability varies.

It should be appreciated that the scope of the invention is not limited to the scope of the embodiment described.

In the embodiment described and illustrated, the fuel system has provision for two fuel supplies (a liquid fuel such as gasoline, and a gaseous fuel such as CNG), as well as a supply of compressed air.

As mentioned previously, the fuel system according to the invention may be used for delivering a variety of fuel types to an engine. The engine could be configured to operate on any of the designated liquid fuels, and optionally be able to switch between the liquid and gaseous fuels. The fuel system may, for example, be configured to accommodate at least one liquid fuel type (and possibly several different liquid fuel types) as well as at least one gaseous fuel type (and possibly several different gaseous fuel types), and switch between the various fuel types. A vehicle fitted with an engine configured for operation on a variety of fuel types would typically have a plurality of storage systems (such as tanks) for separately holding the various fuel types, and a fuel system capable of delivering the variety of fuel types on demand to the engine.

Further, in the embodiment described, the fluid delivery assembly 80 comprises a sole delivery port 90. Other arrangements are possible; for example, the fluid delivery assembly may be configured to have the several delivery ports, with the fluid delivered being distributed between the delivery ports. Accordingly, if for example the fluid delivered comprises a mixture of fluids, a proportion of the fluid mixture would be delivered through each delivery port. The different fluids comprising the fluid mixture would not be delivered separately of each other through different delivery ports, but rather the fluid mixture would be split between the delivery ports concerned.

Throughout the specification and claims, unless the context requires otherwise, the word "comprise" or variations such as "comprises" or "comprising", will be understood to imply the inclusion of a stated integer or group of integers but not the exclusion of any other integer or group of integers.

The claims defining the invention is as follows:

1. A method for fuelling an internal combustion engine, the method comprising providing a delivery port, a supply for a first fluid comprising a liquid and a supply of a second fluid comprising a gas, at least one of which fluids comprises a fuel for combustion in a combustion chamber, operating the fueling method in one of two delivery modes for an injection event through the delivery port, the two delivery modes comprising a first delivery mode delivering the second fluid into the combustion chamber without the first fluid and a second delivery mode delivering a mixture of the first fluid and the second fluid into the combustion chamber wherein when operating in the second delivery mode the first fluid is metered separately of the second fluid and delivered as a metered quantity of liquid into the second fluid, the second fluid also being metered during the injection event of the second delivery mode to provide a metered quantity delivered during the injection event of the second delivery mode, whereby metered quantities of both the first and second fluids are delivered as the mixture through the delivery port during the injection event of the second delivery mode.

2. The method according to claim 1 wherein the first fluid comprises a liquid fuel.

3. The method according to claim 1 wherein the second fluid comprises a gaseous fuel.

4. The method according to claim 1 wherein the second fluid comprises a gas not intended as a fuel.

5. The method according to claim 4 wherein in the second fluid comprises air for air assisted delivery of the first fluid in the second delivery mode.

6. The method according to claim 1 further comprising providing a supply of a third fluid and selectively delivering the third fluid to the combustion chamber in a third delivery mode.

7. The method according to claim 6 further comprising selectively switching between the second and third fluids.

8. The method according to claim 6 further comprising selectively delivering a mixture of the second and third fluids.

9. The method according to claim 1 wherein the second fluid or a mixture of the first and second fluids is delivered through a common delivery arrangement defining the delivery port.

10. The method according to claim 9 wherein the common delivery arrangement is configured to perform functions of both fluid metering and fluid delivery.

11. The method according to claim 9 wherein the common delivery arrangement has a fluid metering portion and a fluid delivery portion.

12. The method according to claim 11 wherein the first fluid is delivered as a metered quantity by a fluid metering portion into a fluid delivery portion for mixing with the second fluid, and the second fluid is delivered by the fluid delivery portion as a metered quantity during the injection event, whereby metered quantities of both the first and second fluids are delivered as the mixture through the delivery port during the injection event of the second delivery mode.

13. The method according to claim 11 wherein the fluid delivery portion and the fluid metering portion are configured to operate in concert, with the first fluid being metered by the fluid metering device and delivered to the fluid delivery device and the second fluid being metered by the fluid delivery portion during the injection event of the second delivery mode.

14. The method according to claim 13 wherein the fluid delivery arrangement is configured for direct injection.

15. The method according to claim 13 wherein the fluid delivery portion is configured to define the delivery port, with the fluid delivery being delivery of either a single fluid or a mixture of fluids.

16. The method according to claim 15 wherein the delivery port comprises a sole delivery port within the fluid delivery portion.

17. The method according to claim 9 wherein the injection event of the second delivery mode comprises delivering the first and second fluids, with the metered quantity of the second fluid delivered being adjusted to allow for the metered quantity of the first fluid delivered with the second fluid.

18. The method according to claim 17 wherein the first fluid is delivered as a metered quantity by the fluid metering portion into the fluid delivery portion for mixing with the second fluid, and the second fluid is delivered as a metered quantity during the injection event, with the metered quantity of second fluid being adjusted to allow for the metered quantity of first fluid delivered with the second fluid.

19. The method according to claim 18 wherein adjustment of the injection event of the second delivery mode to compensate for the quantity of the first fluid to be delivered during injection comprises any one of adjustment of the duration of the injection event, adjustment of the pressure of the second fluid during the injection event, adjustment of the quantity of fluid injected, or any combination thereof.

20. A fuel system for an engine, the fuel system comprising a first fluid path for a first fluid comprising a liquid and a second fluid path for a second fluid, the first and second fluid paths communicating with a common delivery arrangement for delivering fuel to the engine, wherein the fuel comprises either the first fluid or the second fluid or a mixture thereof delivered through the common delivery arrangement, and wherein the common delivery arrangement comprises a controller, a fluid metering portion, a fluid delivery portion and a delivery port, the common delivery arrangement being selectively operable by the controller for delivery of the second fluid without the first fluid in a first delivery mode or for delivery of the mixture of the first and second fluids in a second delivery mode, wherein when operating the second delivery mode the first fluid is metered by the controller separately of the second fluid and delivered as a metered quantity of liquid by the fluid metering portion into the fluid delivery portion for mixing with the second fluid, and the second fluid is metered by the controller during the injection event of the second delivery mode to provide a metered quantity delivered during the injection event of the second delivery mode, whereby metered quantities of both the first and second fluids are delivered as the mixture through the delivery port during the injection event of the second delivery mode.

21. The fuel system according to claim 20 wherein the first fluid path is configured for delivery of a liquid fuel.

22. The fuel system according to claim 20 wherein the second fluid path is configured for delivery of a gaseous fuel.

23. The fuel system according to claim 20 further comprising a third fluid path configured for delivery of compressed air to the common delivery arrangement.

24. The fuel system according to claim 23 wherein the second fluid fuel path and the third fluid path selectively communicate with the common delivery arrangement along a common path, whereby delivery to the common delivery arrangement can be selectively switched by the controller between the second fluid fuel path and the third fluid path.

25. The fuel system according claim 20 wherein the fluid delivery portion is configured for direct injection.

26. The fuel system according to claim 20 wherein the common delivery arrangement further comprises a fluid delivery device defining the fluid delivery portion and a liquid metering device defining the fluid metering portion, the fluid delivery device and the liquid metering device being configured to operate in concert, with liquid being metered by the liquid metering device and delivered to the fluid delivery device and gas being metered by the fluid delivery device during the injection event.

27. The fuel system according to claim 26 wherein the fluid delivery device is configured to define the delivery port for fluid delivery, with the fluid delivery being delivery of either a single fluid or a mixture of fluids.

28. The fuel system according to claim 27 wherein the delivery port comprises a sole delivery port within the fluid delivery device.

29. A method for fuelling an internal combustion engine, the method comprising providing a delivery port, a supply of a first fluid comprising a liquid fuel for combustion in a combustion chamber and a supply of a second fluid comprising a gas, operating the fueling method in one of two delivery modes for an injection event through the delivery port, the two delivery modes comprising a first delivery mode delivering the second fluid into the combustion chamber without the first fluid and a second delivery mode delivering a mixture of the first fluid and the second fluid into the combustion chamber wherein when operating in the second delivery mode the first fluid is metered separately of the second fluid and delivered as a metered quantity of liquid into the second fluid, the second fluid also being metered during the injection event of the second delivery mode to provide a metered quantity delivered during the injection event of the second delivery mode, whereby metered quantities of both the first and second fluids are delivered as the mixture through the delivery port during the injection event of the second delivery mode, and wherein in the second delivery mode the injection event comprises delivering the first and second fluids, with the metered quantity of the second fluid delivered being adjusted to allow for the metered quantity of the first fluid delivered with the second fluid.

30. The method according to claim 29 wherein the second fluid comprises a gaseous fuel.

31. The method according to claim 29 wherein the second fluid comprises air for air assisted delivery of the first fluid in the second delivery mode.

32. The method according to claim 29 wherein adjustment of the injection event of the second delivery mode to compensate for the quantity of the first fluid to be delivered during injection comprises any one of adjustment of the duration of the injection event, adjustment of the pressure of the second fluid during the injection event, adjustment of the quantity of fluid injected, or any combination thereof.

* * * * *

UNITED STATES PATENT AND TRADEMARK OFFICE
CERTIFICATE OF CORRECTION

PATENT NO. : 10,184,440 B2  
APPLICATION NO. : 14/126057  
DATED : January 22, 2019  
INVENTOR(S) : Caley Page 1 of 1

It is certified that error appears in the above-identified patent and that said Letters Patent is hereby corrected as shown below:

On the Title Page (Column 2, (57) Abstract Line 4):
Delete "theft" and insert --their-- therefor (Column 2, Other Publications Line 1):
Delete "Examing" and insert --Examining-- therefor In the Specification (Column 7, Best Mode(S) For Carrying Out The Invention Line 67):
Delete "theft" and insert --their-- therefor (Column 11, Best Mode(S) For Carrying Out The Invention Line 19):
Delete "fluid" and insert --fuel-- therefor (Column 11, Best Mode(S) For Carrying Out The Invention Line 33):
Delete "fluid" and insert --fuel-- therefor (Column 13, Best Mode(S) For Carrying Out The Invention Line 10):
Delete "theft" and insert --their-- therefor Signed and Sealed this
Twenty-sixth Day of March, 2019

Andrei Iancu
*Director of the United States Patent and Trademark Office*